(12) United States Patent
Bochen et al.

(10) Patent No.: US 8,205,540 B2
(45) Date of Patent: Jun. 26, 2012

(54) PISTON-CYLINDER UNIT

(75) Inventors: Marian Bochen, Eitelborn (DE); Rainer Massmann, Bonn (DE); Mihai Augustin Vidrean, Sighisoara (RO)

(73) Assignee: Stabilus GmbH, Koblenz (DE)

( * ) Notice: Subject to any disclaimer, the term of this patent is extended or adjusted under 35 U.S.C. 154(b) by 884 days.

(21) Appl. No.: 12/218,643

(22) Filed: Jul. 17, 2008

(65) Prior Publication Data

US 2009/0020005 A1    Jan. 22, 2009

(30) Foreign Application Priority Data

Jul. 18, 2007   (DE) .......................... 10 2007 033 380
Jun. 20, 2008   (DE) .......................... 10 2008 029 016

(51) Int. Cl.
*F15B 15/26* (2006.01)
(52) U.S. Cl. .......................................................... 92/26
(58) Field of Classification Search ................ 92/15, 23, 92/26
See application file for complete search history.

(56) References Cited

U.S. PATENT DOCUMENTS

| | | | | |
|---|---|---|---|---|
| 2,221,979 A | * | 11/1940 | Levy | 92/26 |
| 3,397,617 A | * | 8/1968 | Cast et al. | 92/23 |
| RE27,294 E | * | 2/1972 | Fredd | 92/26 |
| 5,540,138 A | * | 7/1996 | Robbins | 92/23 |

FOREIGN PATENT DOCUMENTS

| | | | | |
|---|---|---|---|---|
| DE | 23 45 503 A1 | | 3/1975 | |
| DE | 3730808 A1 | * | 3/1989 | 92/23 |
| JP | 57-016043 (U) | | 1/1982 | |
| JP | 57-032240 (U) | | 2/1982 | |
| JP | 57-058146 (U) | | 4/1982 | |

* cited by examiner

*Primary Examiner* — Daniel Lopez

(74) *Attorney, Agent, or Firm* — Cozen O'Connor (57) ABSTRACT

The invention pertains to a piston-cylinder unit for a hinged lid, especially a motor vehicle hinged lid, with a closed first end, a cylinder, a piston installed in the cylinder with freedom to slide back and forth, the piston dividing the cylinder into a working chamber remote from the first end and a second working near the first end; and a piston rod, which is attached to one side of the piston, projects through the first working chamber, and passes out of the cylinder concentrically to the central longitudinal axis of the cylinder through a guide and sealing device at the second end opposite the first end, where a first locking element is provided on the piston rod, and a second locking element is provided on the cylinder to establish a mechanical interlock, and where one of the locking elements comprises a sleeve, which cooperates with the other locking element to establish an interlock.

21 Claims, 7 Drawing Sheets

PISTON-CYLINDER UNIT

CROSS-REFERENCE TO RELATED APPLICATION

This application claims priority to German Application Nos. 10 2007 033 380.5 and 10 2008 029 016.5, the entire contents of which are hereby incorporated by reference.

BACKGROUND OF THE INVENTION

1. Field of the Invention

The invention relates generally to a piston cylinder unit. In particular, the invention relates to a piston cylinder unit having a mechanical interlock.

2. Description of the Related Art

A mechanical interlock in gas springs, which comprises a first locking element on the piston-side end of the piston rod and a second locking element on the opposite end of a cylinder closed by a sealing and guide package is disclosed in DE 23 45 503 A1. In a first embodiment, the first locking element comprises a cone pointing toward the second locking element; adjacent to the cone is an annular groove. The second locking element is designed as a sleeve, which has a groove in its inside circumference. A spring ring is laid loosely in this groove. The sleeve is held axially in place by a pleat in the cylinder and by the sealing and guide mechanism. In a second embodiment, a cam drum is mounted on the piston side of the piston rod. This drum comprises several cams distributed around its outer circumference. The cams extend radially outward from the drum. A cam crown and a cam sleeve, provided on the sealing and guide package, are attached to the cylinder by a pleat in the cylinder. The cam sleeve and the cam crown comprise curved sections in the form of radially inward-projecting cams. The cams of the cam drum have repelling flanks, and the cam sleeve and the cam crown comprise both repelling flanks and catches.

SUMMARY OF THE INVENTION

One object of the invention is to create a piston-cylinder unit having a simple design adapted to be locked in place in the pushed-in state and also in the pulled-out state.

The invention relates to a piston-cylinder unit a cylinder with a closed first end, a piston installed in the cylinder with freedom to slide back and forth, the piston dividing the cylinder into a working chamber or work space remote from the first end and a second working chamber or work space near the first end and a piston rod, which is attached to one side of the piston. The piston rod, which is situated along a central longitudinal axis of the cylinder, projects through the first working chamber and passes out of the cylinder, through a guide and sealing device at the second end of the cylinder opposite the first end. A first locking element is provided on the piston rod and a second locking element is provided on the cylinder to establish a mechanical interlock.

According to one embodiment of the invention, a first locking element comprises a latching arm, which cooperates with the second locking element by engaging with it to produce an interlocking action, or in that the second interlocking element comprises a latching arm, which cooperates with the first locking element by engaging with it to produce an interlocking action.

In one embodiment of the invention, the latching arms are designed with the elasticity of springs.

In one embodiment of the invention, the first locking element comprises a ring-shaped section mounted on a pin that extends from the piston rod.

In another embodiment of the invention, the first locking element comprises a ring-shaped section located near a connecting device assigned to the piston rod.

In another embodiment of the invention, the second locking element has a ring-shaped section located on the cylinder.

In a further embodiment of the invention, the latching arms have a first elastic area, which extends in the axial direction away from the ring-shaped section.

According to one embodiment of the invention, the latching arms comprise a second area, adjacent to the first area. This second area extends essentially in the axial direction but is bent toward the inside wall of the cylinder. Adjoining the second area of the latching arms is a third area, which extends essentially in the axial direction but is bent toward the central longitudinal axis.

To vary the locking and unlocking forces, the second area and the third area of the latching arms are of either symmetric or asymmetric design. A symmetric design results in the same forces being applied for locking and unlocking. Alternatively, an asymmetric design results in different forces for locking and unlocking.

In one embodiment of the invention, the second locking element according to the invention is a ring or sleeve.

In a further embodiment of the invention, a wall thickness of the second locking element is reduced at the two end surfaces and the wall thickness increases toward the inside, as a result of which a first section and a second section are formed.

In one embodiment of the invention, a transition area is formed between the first section and the second section. The two sections are symmetric or asymmetric. The locking and unlocking forces are varied based at least in part on the symmetry of the two sections.

In one embodiment of the invention, to fasten the second locking element in the cylinder, the second locking element comprises a circumferential groove in its lateral surface.

In another embodiment of the invention, one or more recesses in the cylinder form the second locking element.

In one embodiment of the invention, the person bringing the hinged lid into the locked position can hear the latching and unlatching of the two locking elements. The sound of the latching and unlatching makes it possible to verify that the two locking elements have interlocked.

In another embodiment of the piston-cylinder unit, the latching arms extend through an opening in a stepped ring disk, and a spring is provided between the stepped ring disk and the side of the piston facing the first connecting device. The spring exerts a force on the stepped ring disk acting in the direction toward the first connecting device, thus pushing the stepped ring risk against the arc-like first areas of the latching arms, as a result of which these arms are pretensioned toward the central longitudinal axis.

In another embodiment of the invention, the first locking element or the second locking element is designed as a ball-ended pin.

In another embodiment of the invention, the latching arms have a first spring-like area that extends radially away from the ring-shaped section.

According to the one embodiment of the invention, the latching arms comprise a second area, which adjoins the first area. This second area extends in the radial direction of the cylinder but is bent in the axial direction of the cylinder.

In another embodiment of the invention, the first elastic areas of the latching arms, when in the unlocked position, comprise a pretension which corresponds to a first equilibrium position, and, when in the locked position, comprise a pretension acting in the opposite direction corresponding to a second equilibrium position.

For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 6b shows a perspective view of the locking element according to FIG. 6a;

FIG. 11b shows another view of the piston-cylinder unit shown in FIG. 11a.

DETAILED DESCRIPTION OF THE PRESENTLY PREFERRED EMBODIMENTS

Figure 1:
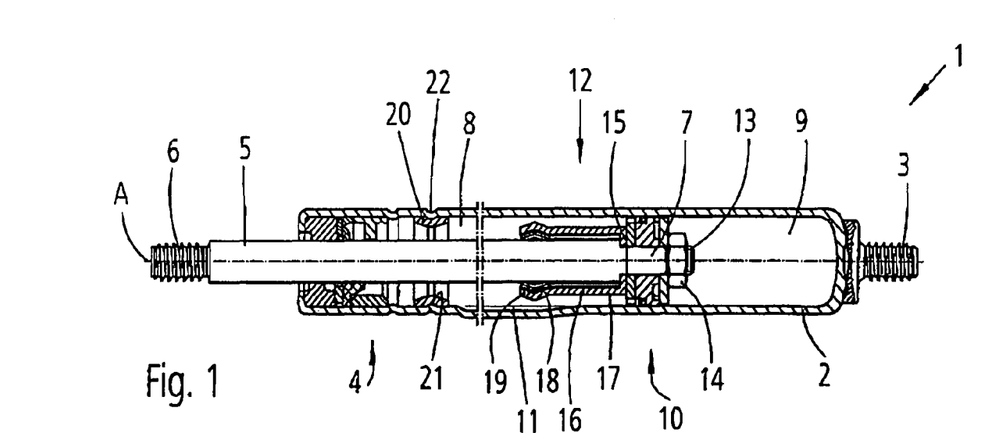
FIG. 1 shows a longitudinal cross section of a first exemplary embodiment of a piston-cylinder unit with a first and a second locking device.

FIG. 1 shows a longitudinal cross section through a piston-cylinder unit 1. The piston-cylinder unit 1 is depicted in this embodiment as a single-tube vibration damper. Piston-cylinder unit 1 has a cylinder 2, which has a first end that is closed, at which end a first connecting device 3 is provided. At the other end of the cylinder 2, opposite the first connecting device 3, a sealing and guide package 4 is provided. A piston rod 5 is guided by the sealing and guide package 4 to the outside along a central longitudinal axis A in a sealed and axially movable manner. A second connecting device 6 is located at the outward-projecting end of the piston rod 5. Joint eyes, ball sockets, or the like (not shown) are attached to the connecting devices 3 and 6. These eyes or sockets are used to attach one end of the piston-cylinder unit 1 to a stationary component (also not shown), such as the body of a vehicle, and the other end to a hinged part, such as a luggage compartment lid, which can pivot relative to the stationary part.

At the end of the piston rod 5, opposite the second connecting device 6, a pin 7, preferably of reduced diameter, is provided which forms a step on the piston rod 5. A piston assembly, referred to collectively as piston 10, is mounted on the pin 7. Piston 10 divides the cylinder 2 into a first working space 8 on the piston rod side and a second working space 9 on the side of the piston opposite the piston rod. The piston 10 preferably has flow connections through which a fluid, preferably oil or a pressurized gas in the form of nitrogen, can flow from the first working space 8 to the second working space 9 and vice versa. Another flow connection can be provided in the form of a groove 11 extending axially along the cylinder 2.

A first locking element 12 is installed between the step formed by the pin 7 and the piston 10, where the step serves as a stop for the first locking element 12 and the piston 10. The end of the pin 7 is provided with a thread 13, onto which a threaded nut 14 can be screwed to hold the piston 10 and the first locking element 12 on the pin 7. Other connecting techniques such as riveting, welding, or the like can also be used. The first locking element 12 comprises a ring-shaped section 15, which extends radially from the pin 7 toward the inside wall of the cylinder 2 but does not touch the inside wall. A plurality of latching arms 16 extends axially from the section 15 into the first working space 8. Although plural latching arms 16 are shown, one or more latching arms 16 may be used.

Each latching arm 16 preferably includes three segments. A first area or segment 17 comprises an elastic first segment 17. The first segment 17 points substantially axially toward the sealing and guide package 4. A second area or segment 18 coupled to the first segment 17 extends toward the sealing and guide package 4 with a bend toward the inside wall of the cylinder. A third area or segment 19 coupled to the second area 18 extends essentially toward the sealing and guide package 4 but with a bend back toward the central longitudinal axis A. It should be noted that the segments 17, 18, 19 are preferably adjoining.

In another embodiment, not shown, locking element 12 comprises at least three segments. The first area or segment extends substantially along the longitudinal axis of the cylinder and is preferably an elastic material. A second area or segment, coupled to the first segment continues along the longitudinal axis of the cylinder with a bend away from the inside wall of the cylinder. A third area or segment, coupled to the second area, extends essentially along the longitudinal axis of the cylinder but with a bend back toward the inside wall of the cylinder.

A second locking element 20 is installed in a portion of the cylinder 2 near the sealing and guide package 4. The second locking element 20 is preferably a ring or sleeve and has a groove 21 in an external surface thereof. Material of the cylinder 2 is formed into pleats or several circumferential catches 22, which are configured to be pressed into groove 21. The wall thickness of the sleeve-like second locking element 20 is preferably smaller at the two end surfaces and increases toward the inside, as a result of which a ramp-like first section 23 and a ramp-like second section 24 are formed (see FIG. 2).

Figure 2:
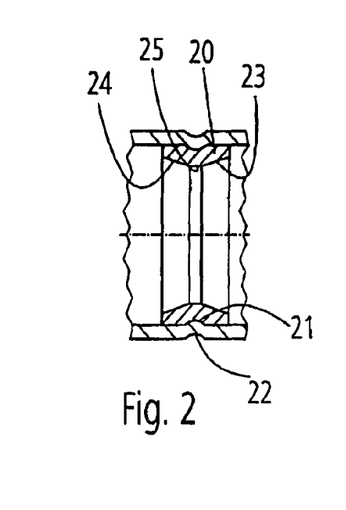
FIG. 2 shows a detailed view of a first embodiment of a locking element of the piston-cylinder unit of FIG. 1 in longitudinal cross section.

At the point where the first and second sections end, a transition area 25 is formed. Transition area 25 can be designed as a peak or as a flat surface extending in the axial direction.

When the piston rod 5 travels out of the cylinder 2, the third segment 19 of the first locking element 12 comes into contact with the first section 23 of the second locking element 20. A first embodiment of locking element 20 is shown in detail in FIG. 2. First section 23 of lock element is configured to push the latching arm 16 toward the central longitudinal axis A. After the second segment 18 of the latching arm 16 of the first locking element 12 has passed over the transition area 25, it arrives at the second section 24. The latching arm 16 moves back to its original shape when the second segment 18 of latching arm 16 reaches second section 24. Preferably, the latching and unlatching of the two locking elements 12 and 20 are audible. It should be noted that the first and second sections 23, 24 are substantially equal in the embodiment depicted in FIG. 2.

By appropriate design of the sections 23 and 24, the retaining force of the interlock can be varied. Sections 23 and 24 can comprise different slopes in order to provide different locking and unlocking forces.

Figure 3:
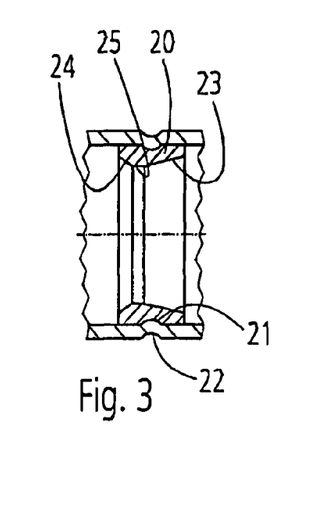
FIG. 3 shows a detailed view of a second embodiment of a locking element of the piston-cylinder unit of FIG. 1 in longitudinal cross section.

According to the a second embodiment of second locking element 20 shown in FIG. 3, to unlock the device, greater force must be applied than that which would be required for the normal inward travel of a piston-cylinder unit not equipped with a locking device. So that unlocking can be carried out without the need to exert an inordinate amount of force, the second locking element 20 can be located a defined distance away from the sealing and guide package 4, as a result of which a certain play is possible between the first and second locking elements. Thus, when the piston-cylinder unit 1 travels inward, the latching arm 16 of the first locking element 12 can develop a certain momentum before it must move over the second section 24 of the second locking element 20.

According to one embodiment, the latching arm 16 of the first locking element 12 can be moved over the first section 23 of the second locking element 20 simply by the outward-thrusting force of the piston-cylinder unit 1. According to another embodiment, a spring force of the latching arm 16 or the angle of the first section 24 is selected so that the piston rod 5 travels out of the cylinder 2 until the third segment 19 of the latching arm 16 strikes the first section 23 of the second locking element 20. The third segment of latching arm 16 is moved over the first section 23 with an application of manual force to the pivoting component such as, for example, a luggage compartment lid (not shown).

Figure 4:
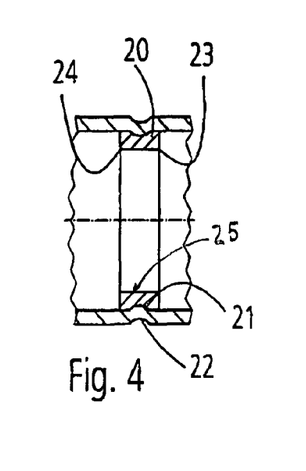
FIG. 4 shows a detailed view of a third embodiment of a locking element of the piston-cylinder unit of FIG. 1 in longitudinal cross section.

In the third embodiment of the second locking element 20 shown in FIG. 4, the transition area 25 extends concentrically as a bore through the second locking element 20, where the first section 23 and the second section 24 are formed by the inside circumferential edges of the bore at the two axial end surfaces of the second locking element 20.

Figure 5:
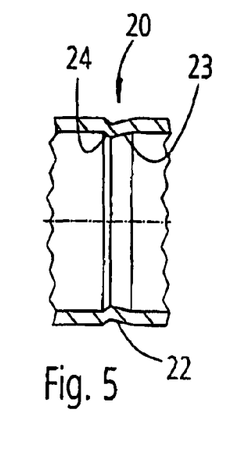
FIG. 5 shows a detailed view of a fourth embodiment of a locking element of the piston-cylinder unit of FIG. 1 in longitudinal cross section.

FIG. 5 shows another embodiment of the second locking element 20. A circumferential recess 22 in the cylinder 2 forms the second locking element 20. The first and section sections 23 and 24 of locking element 20 are in the form of ramps with different slopes.

Figure 6A:
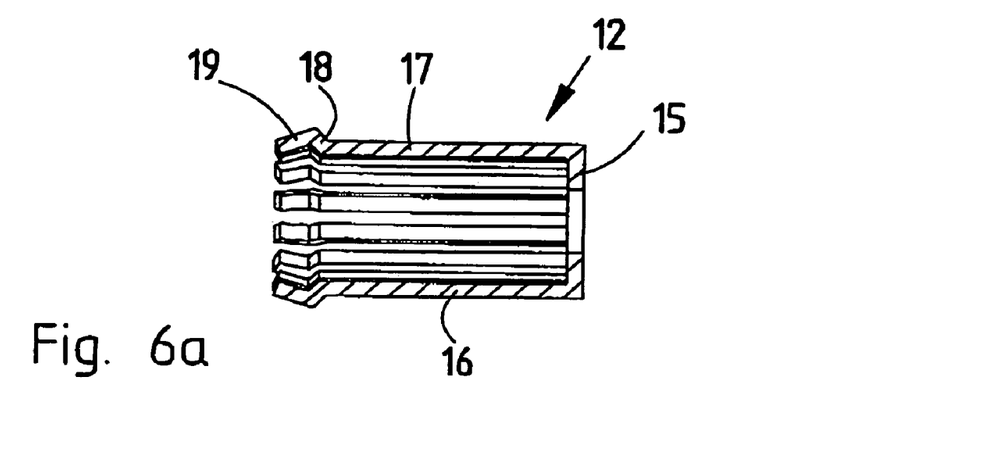
FIG. 6a shows a detailed view of a fifth embodiment of a locking element of the piston-cylinder unit of FIG. 1 in longitudinal cross section.
Figure 6B:
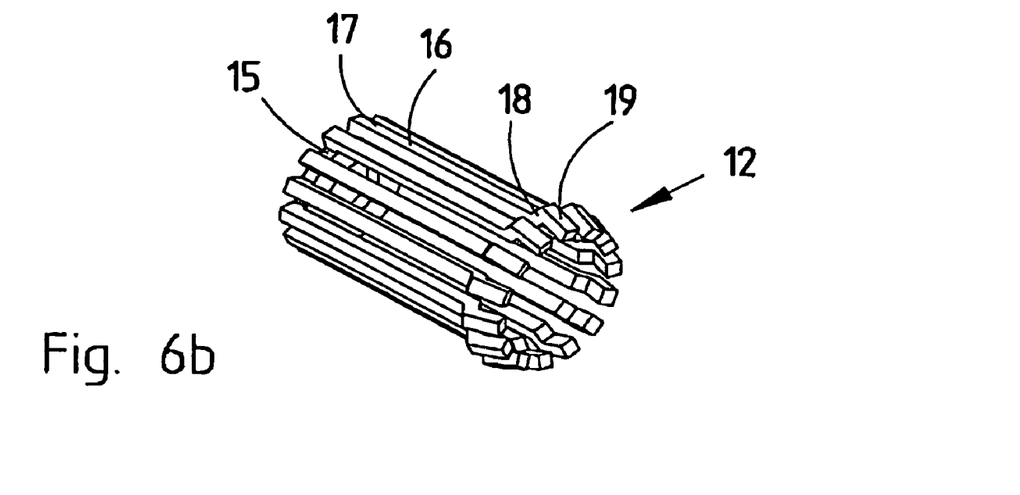

FIG. 6a shows a longitudinal cross section through the cage-like first locking element 12; FIG. 6b shows a perspective view of the first locking element 12 of FIG. 6a. In comparison to the first locking element 12 shown in FIG. 1, the second area 18 and the third area 19 in this embodiment are at a different angle. As a result, the retaining force of the lock can be varied. This variation, however, can also be a function of the slopes of the first and second sections 23 and 24 of the second locking element 20. It should be noted that the retaining forces are a function of at least the first and second sections 23 and 24 of locking element 20, the angles of second and third segments 18 and 19 of latching arm 16, and the elasticity of latching arm 16.

As can be seen in FIG. 6b, the first section 15 of the ring-shaped locking element 12 is designed as a ring-shaped disk, from which the latching arms 16 extend in the axial direction.

Figure 6C:
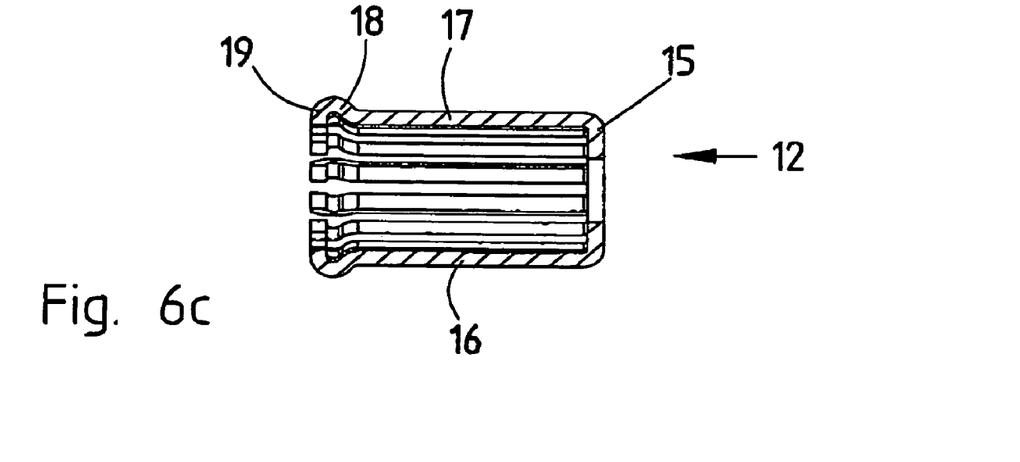
FIG. 6c shows a detailed view of sixth embodiment of a locking element of the piston-cylinder unit of FIG. 1 in longitudinal cross section.

FIG. 6c shows another embodiment of the first locking element 19, where the second area 18 and the third area 19 of the latching arms 16 cooperate to form a semicircle.

It should be noted that while locking element 12 is described as being mounted to piston 10 and locking element 20 is described as being mounted to or as a portion of cylinder 2, in another embodiment, locking element 20 can be configured to be mounted to piston 10 and locking element 12 can be configured to be mounted to or be a portion of cylinder 2

Figure 7:
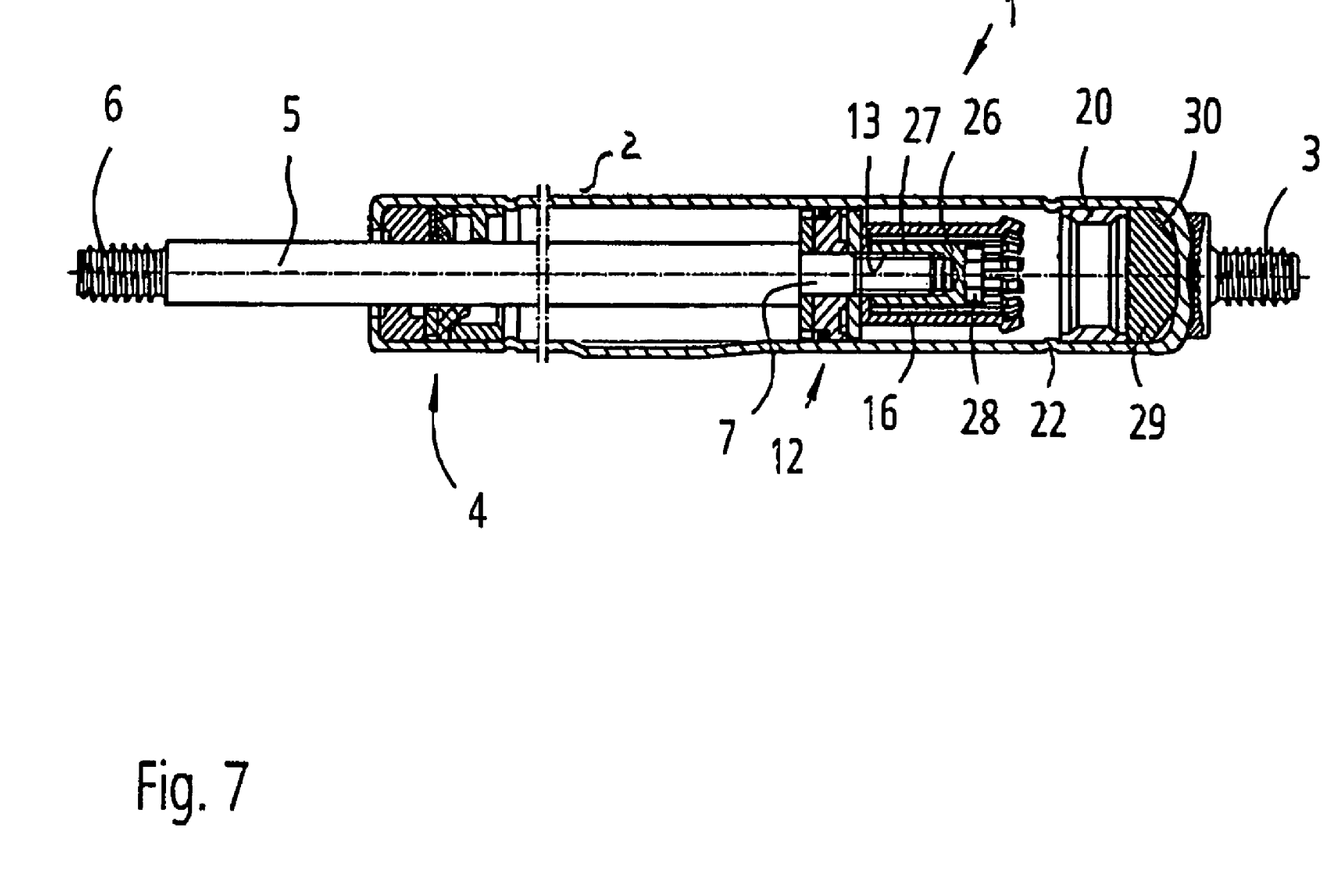
FIG. 7 shows a longitudinal cross section of a second exemplary embodiment of a piston-cylinder unit.

FIG. 7 shows another embodiment of the piston-cylinder unit 1. In contrast to the embodiment shown in FIG. 1, the elastic latching arms 16 of the first locking element 12 extend toward the connecting device 3 of the piston-cylinder unit 1. The end of the pin 7 is provided with a thread 13, onto which a fastening element 26 with an inside thread 27 is screwed to hold the piston 10 and the first locking element 12 in place on the piston rod 5. Fastening element 26 preferably has a recess 28 in the form of, for example, a hex socket, a slot, a cross recess, or the like, in the end facing the connecting device 3 to accept an appropriate driver so that fastening element 26 can be threaded onto the end of pin 7. Alternatively, fastening element 26 is a hex-nut or the like. In one embodiment, ring portion 15 of locking element 12 has a threaded bore to fasten it to the end of pin 7.

The second locking element 20 is mounted in, or a portion of, the cylinder 2 at the first, closed end of the cylinder 2. The second locking element 20 is supported at one end surface against a disk 29, which is supported by the closed first end of the cylinder 2. The opposite end of locking element 20 is held axially in place by one or more catches 22 in the lateral surface of the cylinder 2.

The disk 29 preferably includes a circumferential bevel 30 facing the connecting device 3 to compensate for tolerances in the area where the cylinder 2 is bent and thus to guarantee accurate seating for the second locking element 20.

It is conceivable that the second locking element 20 could be an integral part of the disk 29, or alternatively the two components could be connected to each other to form a sub-assembly.

The way in which the lock functions is the same as that described on the basis of FIG. 1, except that the piston-cylinder unit 1 shown in FIG. 7 can now be locked when in the pushed-in state.

Figure 8A:
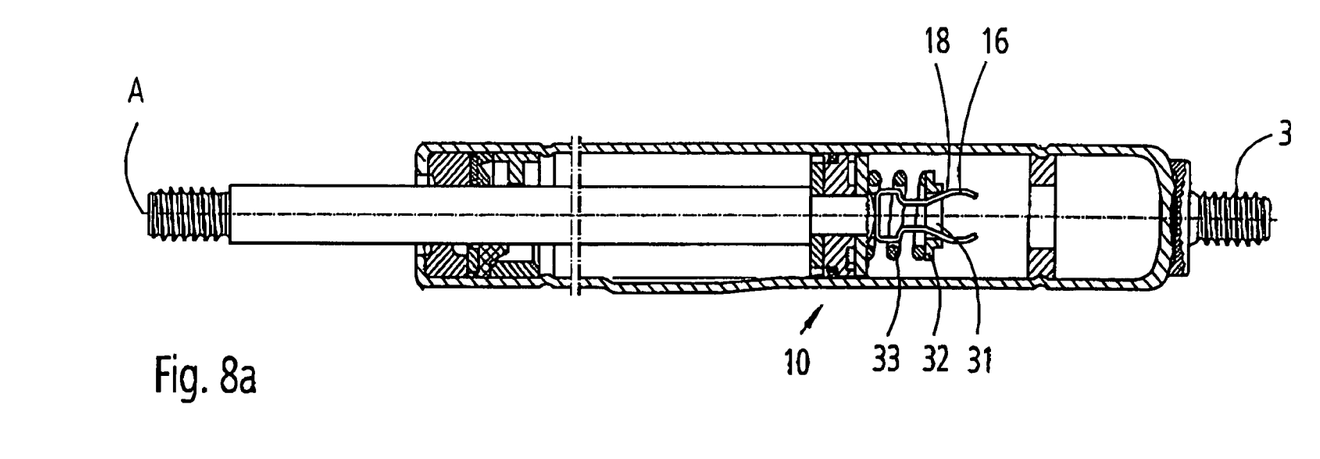
FIG. 8a shows a longitudinal cross section of a third embodiment of a pulled-out piston-cylinder unit.

FIG. 8a shows another embodiment of the invention. As shown, latching arm 16 extends through an opening 31 in a stepped ring disk 32. A spring 33 is installed between the stepped ring disk 32 and the side of the piston 10 facing the first connecting device 3. The spring 33 exerts force on the stepped ring disk 32 in the direction toward the first connecting device 3, thus pushing the stepped ring disk 32 against the arc-like first areas 18 of the latching arms 16, as a result of which these arms are pretensioned in the direction toward the central longitudinal axis A.

Figure 8B:
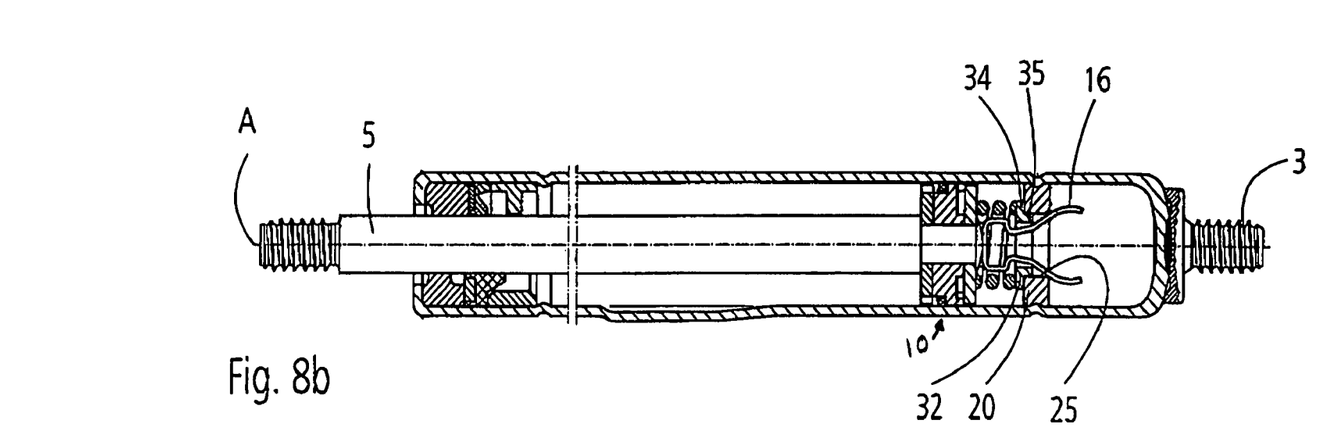
FIG. 8b shows a detailed pushed-in view of the third embodiment of the locking element of the piston-cylinder unit in longitudinal cross section.

When the piston rod 5, as shown in FIG. 8b, is pushed inward, that is, in the direction toward the first connecting device 3, the latching arms 16 move through the transition area 25 of the second locking element 20. The area 34 of large diameter of the stepped ring disk 32 arrives in contact with the second locking element 20, where the area 35 of small diameter of the stepped ring disk 32 projects into the transition area 25 of the second locking element 20. The latching arms 16 extend farther toward the first connecting device 3. In addition, the latching arms 16 move radially away from the central longitudinal axis A.

Figure 9A:
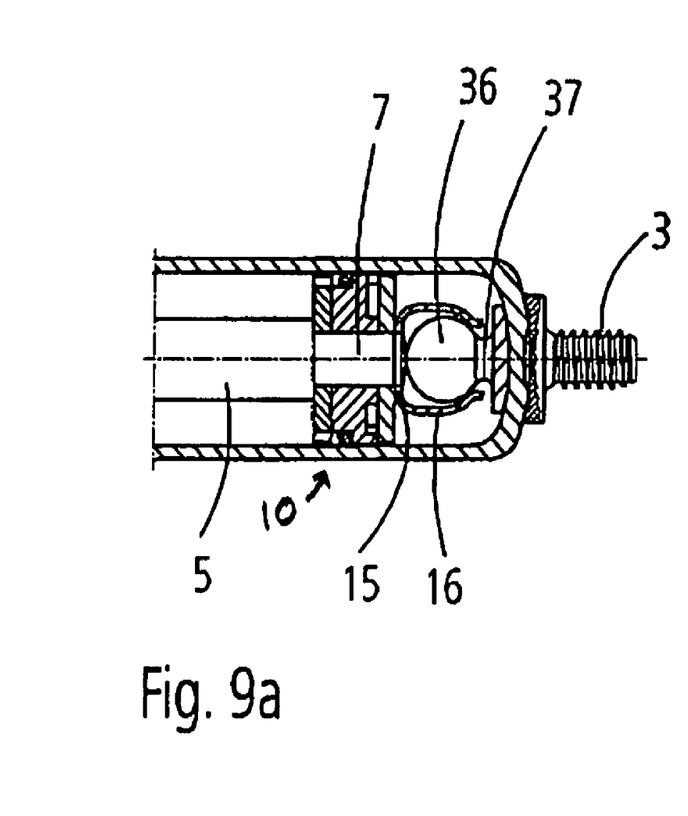
FIG. 9a shows a detailed view of a seventh embodiment of the locking element of the piston-cylinder unit of FIG. 1 in longitudinal cross section.

FIG. 9a shows another embodiment of the invention. The latching arms 16 extend from the ring-shaped section 15, which is located at the end of the pin 7, toward the first connecting device 3. When the piston rod 5 is in the pushed-in position, the latching arms 16 grip the ball 36 of a ball-ended pin 37 mounted at the closed end of the cylinder 2.

Figure 9B:
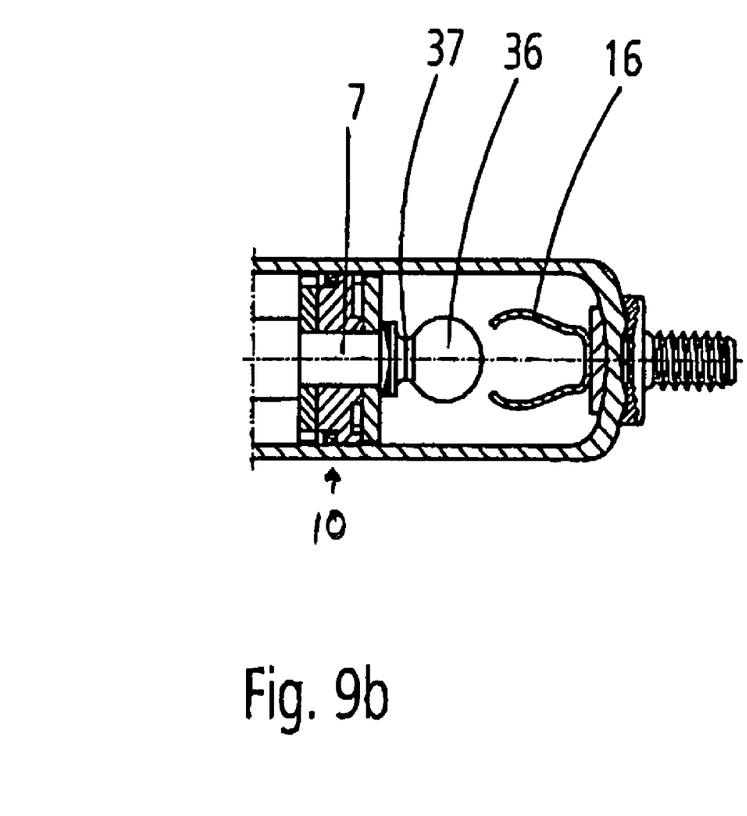
FIG. 9b shows an eighth embodiment of the locking element of the piston-cylinder unit of FIG. 1 in longitudinal cross section.

In the embodiment shown in FIG. 9b, the ball-ended pin 37 is located at the end of the pin 7, and the latching arms 16 extend from the closed end of the cylinder 2 toward the piston 10, so that they can grip the ball 36 of the ball-ended pin 37 when the piston rod is pushed in.

Figure 10:
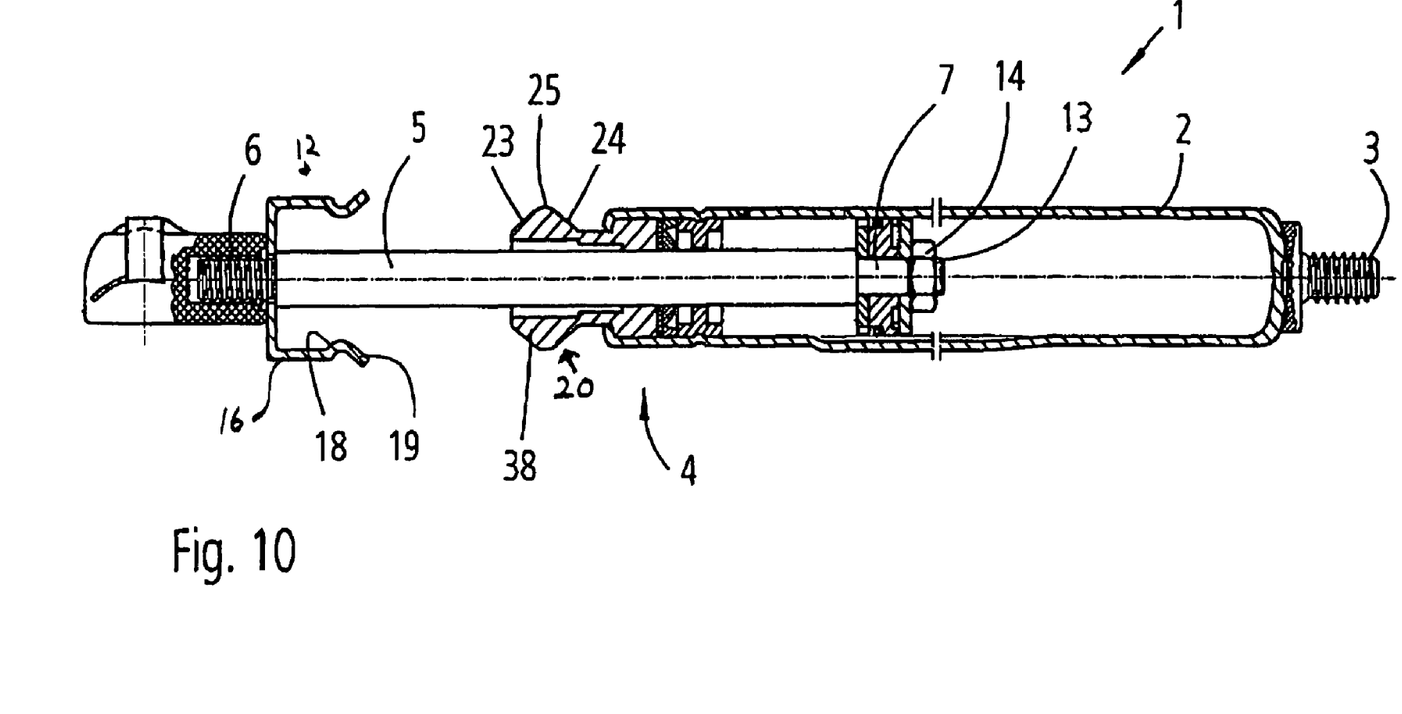
FIG. 10 shows a fourth exemplary embodiment of a piston-cylinder unit in longitudinal cross section.

In the embodiment shown in FIG. 10, the first locking element 12 is pushed over the second connecting device 6 and latching arms 16 extend essentially in the axial direction toward the cylinder 2. The sealing and guide package 4 comprises the second locking element 20, which extends from the end of the piston-cylinder unit 1 opposite the first end axially toward the second connecting device 6. On the part of the second locking element 12 located outside the cylinder 2, a radially outward-directed circumferential bead 38 is formed, as a result of which a ramp-like first section 23 and a ramp-like second section 24 are formed. At the point where the first and second sections end, the transition area 25 is formed, where the transition area 25 can be designed as a peak or as a flat surface extending in the axial direction. The second locking element 20 can be designed as a separate element, or it can be an integral part of a component of the sealing and guide package.

Figure 11A:
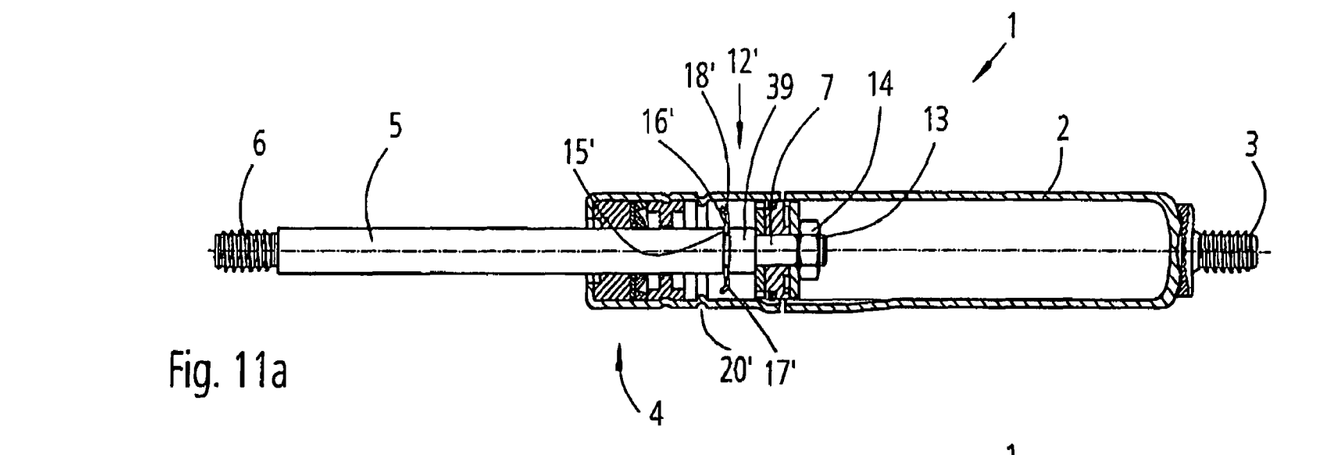
FIG. 11a shows a fifth exemplary embodiment of a piston-cylinder unit in longitudinal cross section.

FIG. 11 a shows the piston-cylinder unit 1 according to another embodiment. A first locking element 12' rests on the step formed by the pin 7 on the piston rod 5. Adjoining the first locking element 12' is a sleeve 39, which is also pushed over the pin 7, and which serves as a spacer between the first locking element 12' and the piston 10. The first locking element 12', the sleeve 39, and the piston 10 are held in place on the pin 7, which is provided with a thread 13, by the threaded nut 14. Latching arms 16' of the first locking element 12' extend essentially in the radial direction away from a ring-shaped section 15' with pretension in the axial direction, thus occupying a first equilibrium position. The latching arms 16' comprise an elastic first area 17', from which a second area 18' extends in an essentially axial direction.

Figure 11B:
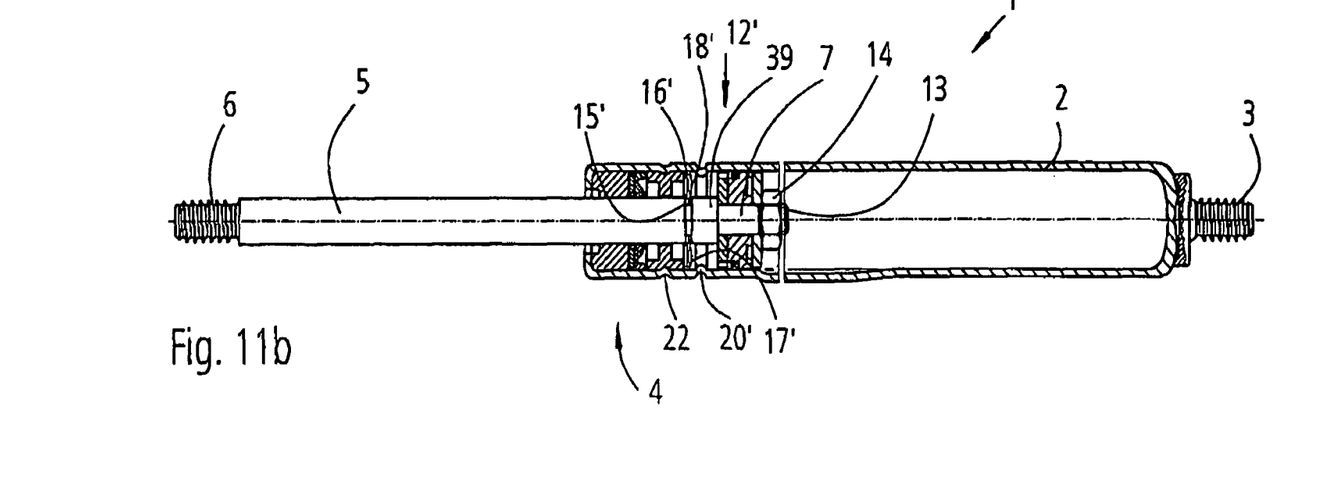

When the piston rod 5 moves out of the cylinder 2, the second area 18' of the first locking element 12' arrives in contact with the sealing and guide package 4, where the first area 17' of the latching arms 16', as shown in FIG. 11b, are somewhat overstretched in opposition to their pretension, so that they spread apart in the radial direction and remain so, thus forming a larger diameter. The first locking element 12' is now located in a second equilibrium position. The sleeve 39 is designed with respect to its axial dimension in such a way that the piston 10 strikes the second locking element 20' at the same time.

When the piston rod 5 is pushed in, the second area 18' arrives in contact with the second locking element 20' formed in the cylinder 2, so that the two locking elements 12' and 20' are interlocked. To release the interlock, additional manual force must be applied to the hinged lid as it is being closed. The first area 17' snaps back from its second equilibrium position to the first equilibrium position, that is, into its original form, and can then be moved past the second locking element 20'. The latching and unlatching of the two locking elements 12' and 20' is preferable audible so that it can be heard by the person who is bringing the hinged lid into the locked or unlocked position.

The first and second locking elements 12' and 20' can also be arranged at the closed end of the cylinder 2, so that the previously described interlocking can also be used for a piston rod 5 which is pushed into the cylinder 2.

It should be noted that the various embodiments could be combined to form a piston cylinder unit that can be locked in the pushed-in and pushed-out state. Additionally, varying the position of locking element 20 can form intermediate lock states.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder unit comprising:
   a cylinder having a closed first end;
   a piston installed in the cylinder configured to move along a longitudinal axis of the cylinder, the piston dividing the cylinder into a first chamber remote from the closed first end and a second chamber proximate to the closed first end;
   a piston rod, which is attached to one side of the piston, the piston rod projects through the first chamber along the longitudinal axis of the cylinder, and passes out of a second end of the cylinder through a guide at the second end of the cylinder, the second end of the cylinder being opposite the closed first end;
   a first locking element provided on the piston rod, and
   a second locking element provided on the cylinder, wherein the first and second locking elements are adapted to establish a mechanical interlock, and
   the first locking element comprises at least one latching arm that cooperates with the second locking element by engaging with it to produce the mechanical interlock;
   wherein the first locking element further comprises
      a stepped ring disk having an opening through which the at least one latching arm extends; and
      a spring between the stepped ring disk and a side of the piston facing a first connecting device, wherein the spring exerts a force on the stepped ring disk in the direction toward the first connecting device, thus pushing the stepped ring disk against a portion of the at least one latching arm pretensioning the at least one latching arm toward the longitudinal axis of the cylinder.

2. The piston-cylinder unit according to claim 1, wherein the at least one latching arm has at least one elastic segment.

3. The piston-cylinder according to claim 2, wherein the at least one latching arm further comprises comprise a second segment that extends substantially in the radial direction but is bent in the axial direction of the cylinder.

4. The piston-cylinder unit according to claim 1, wherein the first locking element further comprises a ring-shaped section located on a pin extending from the piston rod.

5. The piston-cylinder unit according to claim 4, wherein the at least one latching arm has an elastic first segment that extends in the axial direction away from the ring-shaped section.

6. The piston-cylinder unit according to claim 5, wherein the at least one latching arm further comprises a second segment coupled to the first segment, the second segment extending substantially along the longitudinal axis of the cylinder with a bend toward the inside wall of the cylinder.

7. The piston-cylinder according to claim 6, wherein the at least one latching arm further comprises a third segment coupled to the second segment, the third segment extending substantially along the longitudinal axis of the cylinder with a bend toward the longitudinal axis of the cylinder.

8. The piston-cylinder unit according to claim 7, wherein the second segment and the third segment of the at least one latching arm are symmetric.

9. The piston-cylinder unit according to claim 7, wherein the second segment and the third segment of the at least one latching arm are asymmetric.

10. The piston-cylinder unit according to claim 4, wherein the at least one latching arm has an elastic first segment that extends radially from the ring-shaped section.

11. The piston-cylinder unit according to claim 1, wherein the second locking element comprises a ring-shaped section located on the cylinder.

12. The piston-cylinder unit according to claim 1, wherein the second locking element is ring-shaped.

13. The piston-cylinder unit according to claim 12, wherein a wall thickness of the second locking element is smaller at the two axial end surfaces and increases toward the inside forming a first section and a second section.

14. The piston-cylinder unit according to claim 13, further comprising a transition area between the first section and the second section.

15. The piston-cylinder unit according to one of claims 13, wherein the first and second sections are symmetric.

16. The piston-cylinder unit according to one of claims 13, wherein the first and second sections are asymmetric.

17. The piston-cylinder unit according to claim 13, wherein the second locking element has a circumferential groove in a lateral surface by which it is held in place in the cylinder.

18. The piston-cylinder unit according to claim 12, wherein the second locking element comprises a radially projecting circumferential bead forming a first section and a second section.

19. The piston-cylinder unit according to claim 18, further comprising a transition area between the first section and the second section.

20. The piston-cylinder unit according claim 1, wherein one or more recesses in the cylinder form the second locking element.

21. The piston-cylinder unit according to claim 1, wherein the at least one latching arm has an elastic first segment that extends in the axial direction away from the ring-shaped section.

* * * * *